Oct. 12, 1948.  C. L. EKSERGIAN ET AL  2,451,326

BRAKE SHOE ASSEMBLY

Filed Oct. 3, 1946  2 Sheets-Sheet 1

INVENTORS
Carolus L. Eksergian
Paul W. Gaenssle.

BY *Donald B Waite*
ATTORNEY

Oct. 12, 1948.    C. L. EKSERGIAN ET AL    2,451,326
BRAKE SHOE ASSEMBLY
Filed Oct. 3, 1946    2 Sheets-Sheet 2

INVENTORS
Carolus L. Eksergian
Paul W. Gaenssle
BY *Arnold B. Waite*
ATTORNEY

Patented Oct. 12, 1948

2,451,326

UNITED STATES PATENT OFFICE 2,451,326

BRAKE SHOE ASSEMBLY

Carolus L. Eksergian and Paul W. Gaenssle, Detroit, Mich., assignors to The Budd Company, Philadelphia, Pa., a corporation of Pennsylvania Application October 3, 1946, Serial No. 700,948

7 Claims. (Cl. 188—234)

1

The invention relates to brake shoes and more particularly to such shoes having a readily detachable lining.

Usually such shoes comprise a rigid backing member to which the composition lining blocks or pads are directly secured. It has been found that with this arrangement, particularly in heavy duty braking, such as bringing modern high speed trains to a stop, it is almost impossible to avoid high spots in the lining and consequently excessive localized pressures are developed between the lining and brake rotor, which may result in overheating of the braking face of the rotor in localized areas and the development of heat checks, which may lead to cracking of the metal of the rotor and in excessive wear of the lining.

This effect may happen even if the rotor is of the well known centrifugal blower type and the lining blocks are spaced both radially and circumferentially to provide passages between them for the flow of cooking air.

In copending application Serial No. 700,947, entitled "Brake shoe assembly" filed of even date herewith in the name of Paul W. Gaenssle, there is disclosed a brake shoe in which the individual blocks are yieldingly mounted on the shoe backing and secured thereto so as to be readily replaceable and to transmit the braking torque from the respective blocks to the shoe backing.

It is an object of the present invention to improve the shoe assembly, so as to facilitate its manufacture and provide for a more direct transmission of the torque from the blocks to the shoe backing, and to facilitate the assembly of the blocks to the backing and provide for a readily detachable connection of the blocks to the backing.

These and other and further objects and advantages and the manner in which they are attained will become fully apparent from the following detailed description when read in connection with the drawings forming a part of this specification.

2

Figure 1:
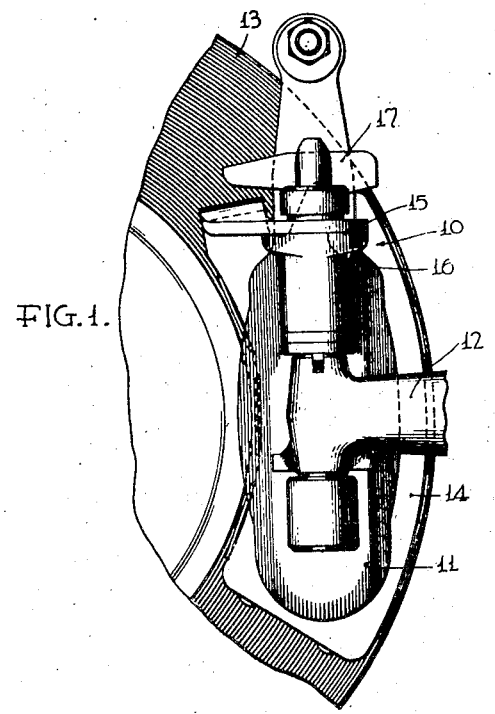
Figure 1 is a fragmentary side elevation of a shoe and cooperating brake rotor to which the invention has been shown applied.
Figure 2:
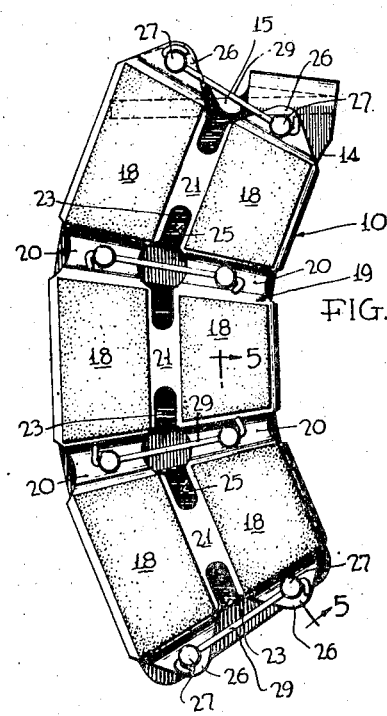
Figure 2 is a face view of the improved shoe.
Figure 6:
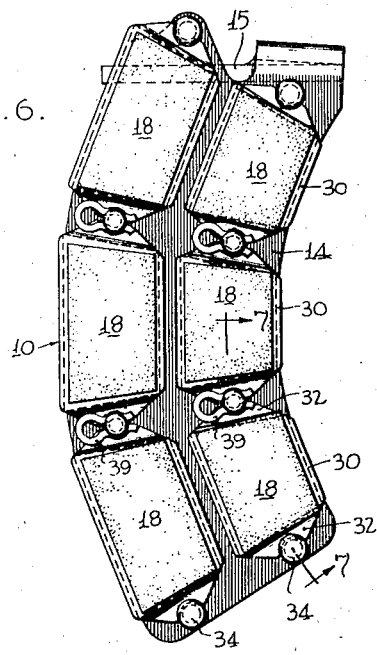
Figure 5:
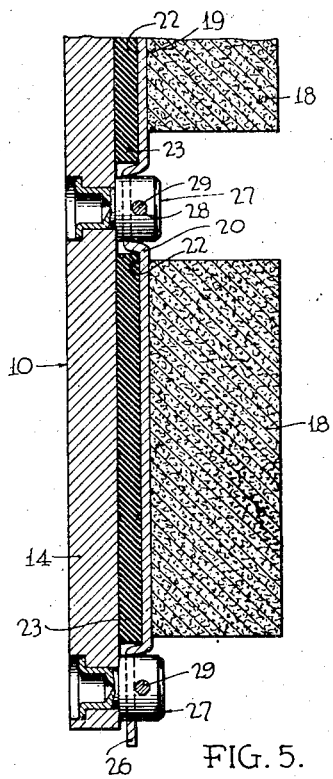
Figure 5 is a fragmentary enlarged detail sectional view taken substantially on the line 5—5 of Fig. 2.
Figure 7:
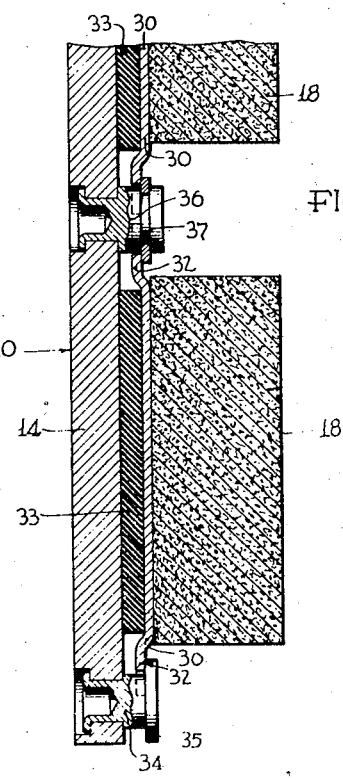
Figure 8:
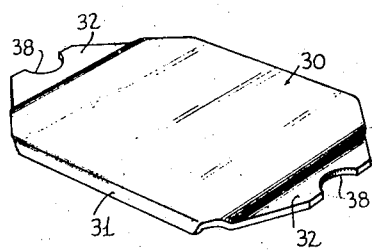

Figure 6 is a view similar to Fig. 2 of a slightly modified arrangement;

Figure 7 is a detail sectional view similar to Fig. 5 of this modification, the section being taken on the line 7—7 of Fig. 6; and Figure 8 is a perspective view of one of the lining pads or block mounting stampings used in the modified form of Figs. 6 and 7.

In the drawings, the invention is shown applied to a brake shoe adapted to coact with a radial face of a brake rotor to effect the braking, but it will be understood that certain features thereof are also applicable to other types of brakes, and applicant does not wish to be limited to the precise forms shown.

In the embodiment shown, the shoe proper, designated by the numeral 10, is removably carried by a rigid mounting member 11 which is, in turn, pivotally carried by a brake lever 12, through which it is pressed against the radial face of a brake rotor, 13, all in a manner well understood in the art. The shoe proper 10 may comprise a rigid backing plate 14 seated against a similar flat face on the mounting member and be held in place on the mounting member by the engagement of an angularly extended end portion 15 of said backing member seated on a widened end portion 16 of the mounting member and readily removably secured in place by the readily detachable means generally designated by 17 which may be similar to the such means disclosed in copending application Serial No. 579,223 filed February 22, 1945 for Brake assembly.

The main body of the backing plate 14 seated against the flat face of the mounting member 11 is of arcuate segmental form and the brake lining is removably mounted on the flat side of said plate opposite its side seated on the mounting member.

Figure 4:
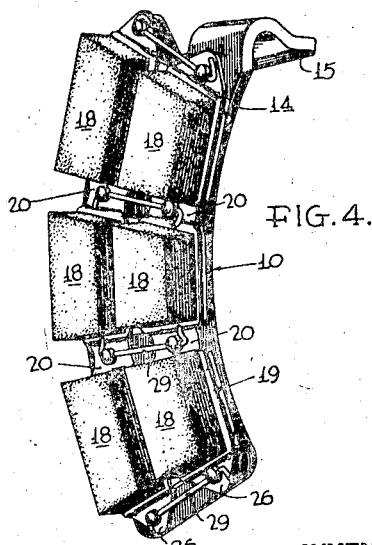
Figure 4 is a perspective view of the shoe.

This removable lining, according to the invention, comprises a plurality of circumferentially and radially spaced individual composition lining pads or blocks 18, shown in this instance to be six in number arranged in three pairs of radially extending such blocks, see Figs. 2 and 4.

For convenience of manufacture and assembly, the blocks are all mounted on a unitary sheet metal stamping 19 which is divided by flexible radial connecting portions 20 and flexible circumferential connecting portions 21, into six shallow pan-like sections corresponding to the number of lining blocks and one of the lining pads or blocks is secured as by cementing to the bottom of each of said sections.

Figure 3:
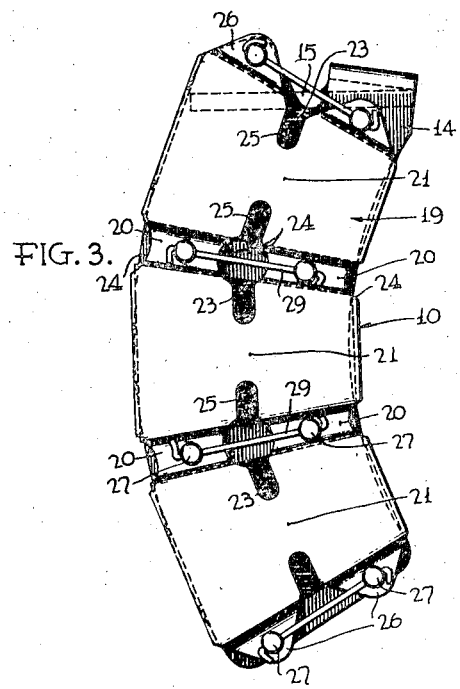
Figure 3 is a similar view with the brake pads or blocks left off.

The pan-like sections form shallow recesses 22 on the sides of said stamping 19 opposite the lining blocks 18, these shallow recesses being arranged to receive rubber or rubber-like pads 23 disposed between them and the adjacent flat face of the backing plate 14 of the shoe. For greater ease in forming the stamping 19 and to reduce the number of parts entering into the structure, each radially arranged pair of blocks has the adjacent side flanges of its respective recesses omitted, and a single rubber pad 23 of substantially the extent of the combined recesses is seated therein, see Figs. 2 and 3.

The flexible connecting portions 20 are narrowed and thus weakened so as to be more readily flexible by the arcuate cut-outs 24 on the opposite sides thereof and the same is true of the connecting portions 21 which are narrowed and weakened by the circumferentially extending slots 25 having rounded ends. This arrangement makes each pan-like section mounting an individual lining block 18 free to have slight universal tilting movement independent of the other sections, by reason of the rubber backing 23 and the nature of the means securing the stamping to the backing member 14, which means will now be described.

The connecting members 20, as is clearly shown in Fig. 5, are offset slightly toward the backing member 14 and tapered end tabs 26, one on each pan-like section disposed adjacent the ends of the stamping, are similarly offset. Centrally of each of the connecting members 20 and centrally of the end tabs 26 are provided holes adapted to freely receive correspondingly spaced projections 27 on the backing member 14, these projections coacting with the stamping to transmit the braking torque from the lining blocks 18 through the stamping 19 to the backing plate 14.

To readily removably secure the lining in place on the backing member 14 with the rubber or rubber-like pads 23 under compression, each of the projections (which are preferably headed studs riveted within countersunk openings in the backing plate as clearly shown in Fig. 5) has its head formed with a transverse hole 28 and wires, as 29, are passed through the holes of adjacent radially spaced projections and bent over in their projecting ends to lock them in place. This arrangement provides a very convenient means for readily removably securing the cushioned lining to the brake shoe backing 14.

The localized central connection of the flexible connecting member 20 and the tabs 26 provided by the projections 27 and cooperating wires 29 permits all the freedom necessary to allow the individual blocks to tilt slightly in all directions, and thus insure equalized braking pressure thereon per unit of area and thereby the avoidance of localized overheating with the possibility of heat checks in the braking rotor.

According to the modification shown in Figs. 6 to 8, in which like parts are designated by corresponding reference numerals, the manner of securement of the pan-like stamping sections 30 is very similar to that shown in the preferred form, but in this modification the pan-like stamping sections are entirely separate from each other and each provided with lateral side flanges 31 and offset tapered end tabs 32, for securing them individually to the backing. Each stamping section 30 carries, as in the preferred form, an individual composition lining block 18, and in the shallow recess formed on the side thereof opposite said block, it receives an individual rubber or rubber-like pad 33, Fig. 7.

The riveted projections are, in this instance, shown as differing slightly in their construction, the end ones 34 having a projecting annular flange 35 on their heads and the intermediate ones 36 having the head formed with an annular groove 37. This difference in construction is primarily to facilitate the assembly of the end sections which have a rounded cut out 38 fitting the adjacent reduced portions of the heads and projecting under the associated flange 35 on said reduced portion of the head, without using additional securing means on said end projections 34. The tabs 32 engaging the intermediate projections 36 have rounded cut outs 38 similar to the end tabs but, since these intermediate heads are not provided with a flange, they can be readily moved downwardly over the heads, and are there locked in place, as by a bent wire spring clip 39 having its free end portions spring-pressed to lock into the annular groove 37 and to securely hold the ends of the adjacent sections in place, see Fig. 6.

It will be seen that, in this modification, as in the preferred form, each lining block is relatively free to tilt under the braking pressure in all directions entirely independently of the other blocks, and the torque is transmitted to the projections in a manner entirely similar to the preferred form.

In both forms, it is desirable that the rubber or rubber-like pads are of an extent which prevents them from entirely filling the associated recesses, so that room for expansion is provided for the relatively incompressible pads to allow them to yield to the tilting movement of the blocks under braking pressure. They are of a thickness, of course, which holds the stamping or stampings carrying the blocks spaced some distance from the flat face of the backing plate 14. Also, by reason of the offset of the connections 20 and tabs 26 or 32 the outer ends of the projections do not extend materially beyond the outer face of the stamping section to which the lining blocks are secured, see Figs. 5 and 7, so that substantially all of the lining may be worn away before replacement is required.

While the invention has herein been described as embodied in several detailed forms, it will be understood that changes and modifications may be made by those skilled in the art without departing from the main features of the invention, and such changes and modifications are intended to be covered in the appended claims.

What is claimed is:

1. A brake shoe for cooperation with a brake rotor, comprising an arcuate backing member to receive the brake-applying thrust and having a flat face on the side thereof opposite the one receiving said thrust, and a pressed metal element removably secured to the flat face of said backing member and being formed with a shallow recess on the side thereof toward said flat face, and a rubber-like cushioning pad received in said shallow recess and compressed between said element and said flat face of the backing member, the side of said pressed metal element opposite said recessed side having secured thereto a composition brake lining, and said removable securing means including a projection from said flat face for transmitting the braking torque from said element to said backing.

2. A brake shoe for cooperation with a brake rotor, comprising an arcuate backing member to receive the brake-applying thrust and having a flat face on the side thereof opposite the one receiving the thrust, and a removable pressed metal element of substantially the extent of said flat face of the backing member, and having circumferentially-spaced shallow recesses on the side thereof toward said flat face, similarly spaced rubber-like cushioning pads received in said shallow recesses and compressed between said element and said flat face of the backing member, the side of said pressed metal element opposite said recessed side having secured thereto similarly spaced composition brake blocks, and securing means arranged adjacent the ends of said element and intermediate said circumferentially-spaced recesses for compressing said rubber-like cushioning pads and transmitting the braking torque to said backing member.

3. A brake shoe for cooperation with a brake rotor, comprising an arcuate rigid backing member to receive the brake-applying thrust and having a flat face on the side thereof opposite the one receiving said thrust, and a brake lining readily detachably secured to said flat face, said lining comprising a plurality of circumferentially and radially spaced composition lining blocks secured to sheet metal backing means, said backing means being formed with shallow recesses on the side thereof opposite the lining blocks and each being of an extent at least substantially equal to the extent of one of said blocks, and rubber-like cushioning pads received in said recesses, the readily detachable securing means connecting said sheet metal backing means to said rigid backing member so as to compress the rubber-like pads and including projections from said flat face to transmit the braking torque to said rigid backing member.

4. A brake shoe for cooperation with a brake rotor, comprising an arcuate backing member to receive the brake-applying thrust and having a flat face, on the side thereof opposite the one receiving said thrust, conforming to the opposed face of the rotor, and a pressed metal element readily detachably secured to the flat face of the backing member and being formed with a shallow recess on the side thereof toward said face, and a rubber-like cushioning pad received in said shallow recess and compressed between said element and said flat face of the backing member, the side of said pressed metal element opposite said recessed side having secured thereto a composition brake lining, and said readily detachable securing means permitting slight tilting of said lining in all directions and including projections from said face transmitting the braking torque from said element to said backing member.

5. A brake shoe for cooperation with a brake rotor, comprising an arcuate backing member to receive the brake-applying thrust and having a flat face on the side thereof opposite the one receiving said thrust and a brake lining readily detachably secured to said flat face, said lining comprising a plurality of circumferentially and radially spaced composition lining blocks secured to a sheet metal backing element of substantially the extent of said arcuate backing member, said element being formed with shallow recesses on the side thereof opposite the lining blocks and each being of an extent at least substantially equal to the extent of one of said blocks, and rubber-like cushioning pads received in said recesses, the readily detachable securing means compressing the rubber-like pads, allowing slight tilting, in all directions, of said lining blocks and transmitting the braking torque to said rigid backing member, the securing means being disposed at the respective ends of said element and between the circumferentially-spaced lining blocks and comprising posts on the arcuate backing member extending slightly above the portions of said element flanking said recesses, and means cooperating with said posts for securing the element in place.

6. A brake shoe for cooperation with a brake rotor, comprising an arcuate backing member to receive the brake-applying thrust and having a flat face, on the side thereof opposite the one receiving said thrust, conforming to the opposed face of the rotor, and a brake lining readily detachably secured to said flat face, said lining comprising circumferentially and radially spaced composition lining blocks secured to a sheet metal backing element of substantially the extent of said arcuate backing member, said element being formed with shallow recesses on the side thereof opposite the lining blocks and weakened circumferentially and radially between the blocks, and rubber-like cushioning pads received in said recesses, the readily detachable securing means locally securing said element to the rigid backing member to place the rubber-like pads under compression, to transmit the braking torque to said arcuate backing member and to permit individual tilting of the composition lining blocks.

7. A brake shoe for cooperation with a brake rotor, comprising an arcuate backing member for receiving the brake-applying thrust and having a flat face on the side thereof opposite the one receiving said thrust, and a pressed metal element removably secured to the flat face of said backing member and being formed with a shallow recess in the side thereof toward said flat face, and a rubber-like cushioning pad received in said shallow recess and compressed between said element and said flat face of said backing member, the side of said pressed metal element opposite said recessed side having secured thereto a composition brake lining, said removable securing means including offset extensions from the recessed portion of said element, projections from the flat face of said backing member engaging said extensions to take the braking torque, and readily removable means engaging said projections for maintaining said extensions in engagement with said projections and the rubber-like pad under compression.

CAROLUS L. EKSERGIAN.
PAUL W. GAENSSLE.

REFERENCES CITED

The following references are of record in the file of this patent:

UNITED STATES PATENTS

| Number | Name | Date |
|---|---|---|
| 362,773 | Neichter | May 10, 1887 |
| 2,236,311 | Eksergian | Mar. 25, 1941 |